Figure 1:
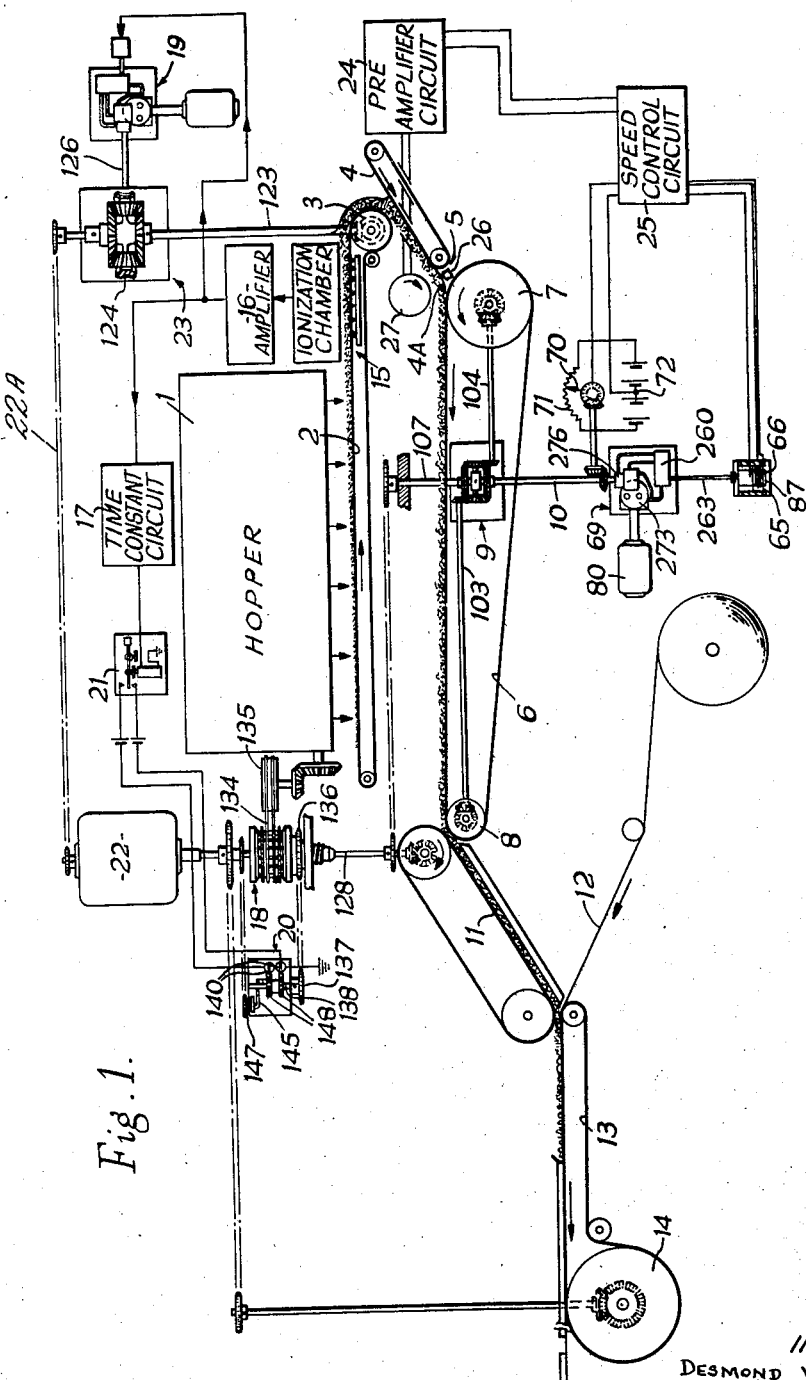

INVENTORS
DESMOND W. MOLINS
GORDON FRANCIS W. POWELL
BY
Watson, Cole, Grindle & Watson
ATTORNEYS Oct. 20, 1959 D. W. MOLINS ET AL 2,909,180
MACHINES FOR MANIPULATING CUT TOBACCO
Filed May 20, 1957 6 Sheets-Sheet 2

INVENTORS
DESMOND W. MOLINS
GORDON FRANCIS W. POWELL
BY
Watson, Cole, Grindle & Watson
ATTORNEYS Oct. 20, 1959 D. W. MOLINS ET AL 2,909,180
MACHINES FOR MANIPULATING CUT TOBACCO
Filed May 20, 1957 6 Sheets-Sheet 3

INVENTORS
DESMOND W. MOLINS
GORDON FRANCIS W. POWELL
BY
Watson, Cole, Grindle & Watson
ATTORNEYS Oct. 20, 1959  D. W. MOLINS ET AL  2,909,180
MACHINES FOR MANIPULATING CUT TOBACCO
Filed May 20, 1957  6 Sheets-Sheet 4

INVENTORS
DESMOND W. MOLINS
GORDON FRANCIS W. POWELL
BY
Watson, Cole, Grindle & Watson
ATTORNEY Oct. 20, 1959  D. W. MOLINS ET AL  2,909,180
MACHINES FOR MANIPULATING CUT TOBACCO
Filed May 20, 1957  6 Sheets-Sheet 5

INVENTORS
DESMOND W. MOLINS
GORDON FRANCIS W. POWELL
BY
Watson, Cole, Grindle & Watson
ATTORNEYS

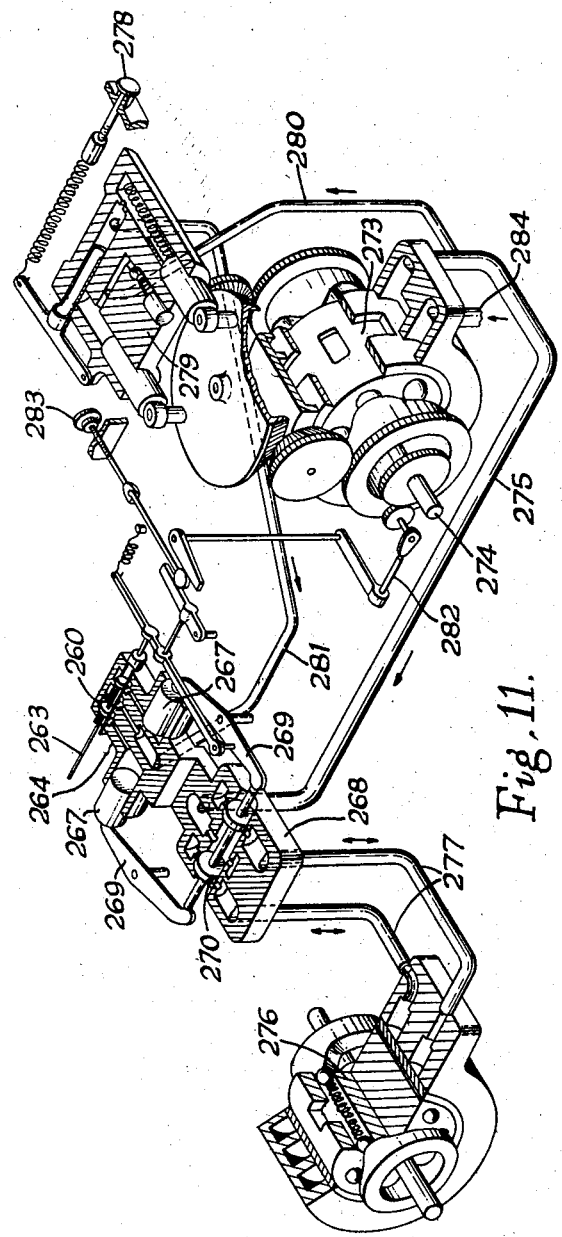

United States Patent Office 2,909,180
Patented Oct. 20, 1959

2,909,180

MACHINES FOR MANIPULATING CUT TOBACCO

Desmond Walter Molins and Gordon Francis Wellington Powell, Deptford, London, England, assignors to Molins Machine Company Limited, Deptford, London, England, a British company Application May 20, 1957, Serial No. 660,391

4 Claims. (Cl. 131—21)

This application is a continuation-in-part of our co-pending application Serial No. 416,374, filed March 15, 1954, now matured as Patent No. 2,800,131, granted July 23, 1957, and the invention relates to machines for manipulating cut tobacco, for example, cigarette making machines, and refers more particularly to the kind of machine wherein the mass of a length of moving tobacco filler is measured by a detector, for example, by subjecting the length to rays from a radio-active source of penetrative radiation, for example, beta rays, the ionization powers of which are absorbed by the material in known proportion to its mass, and determining changes in the absorption with variations in the tobacco mass by an ionization chamber and applying the current due to the ionization to regulate at some stage in the machine the rate at which tobacco is being fed at that stage for the formation of the final product. Machines of this kind are hereafter called "machines of the kind referred to."

In Serial No. 416,374 the variations likely to occur in a moving tobacco filler are discussed at some length and are divided into two groups. One group termed "shorter-term irregularities" is defined as irregularities occurring during time periods not exceeding one second and the other group termed "longer-term irregularities" is defined as "mean irregularities occurring over time periods of at least three seconds" and the machine embodied devices for first manipulating the filler to at least partly correct shorter-term irregularities and later manipulating the filler to at least partly correct longer-term irregularities.

It is however conceivable that the moving filler could be improved by operating on it in the reverse order namely, first correcting for longer-term irregularities and then again correcting for shorter-term irregularities and the pesent invention is concerned with this aspect of the basic idea.

According to the present invention there is provided a machine of the kind referred to comprising means for detecting longer-term irregularities in a moving tobacco filler and manipulating the filler to at least partly correct them and means for detecting shorter-term irregularities in the manipulated filler, and further manipulating the filler to at least partly correct them.

For brevity the term "ray device" will be used hereafter to mean "a radio-active source of penetrative radiation" and the term "source-gap-chamber" will mean a ray box and its associated parts, for adjustment, screening and shielding; the space between ray source and ionization chamber; and the ionization chamber and its associated parts for mounting and adjusting it. The three words source, gap, and chamber, will be used to refer to any separate item of the triple combination.

The attempt to cure longer-term irregularities in the mass of the filler is chiefly to try and keep a very accurate control of the mean weight of the resulting cigarettes while the shorter-term correction is chiefly to smooth out local unevenness in the filler with a view to obtaining cigarettes, as nearly as possible, of the same weight. Both these objectives are ideals but the nearer they are approached the better the product of the machine.

Figure 2:
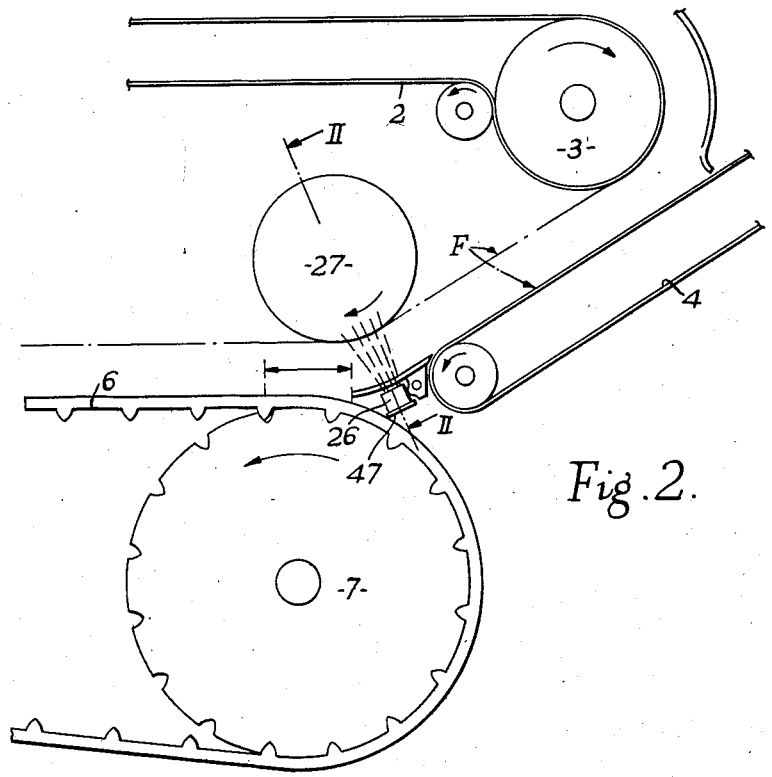
Figure 3:
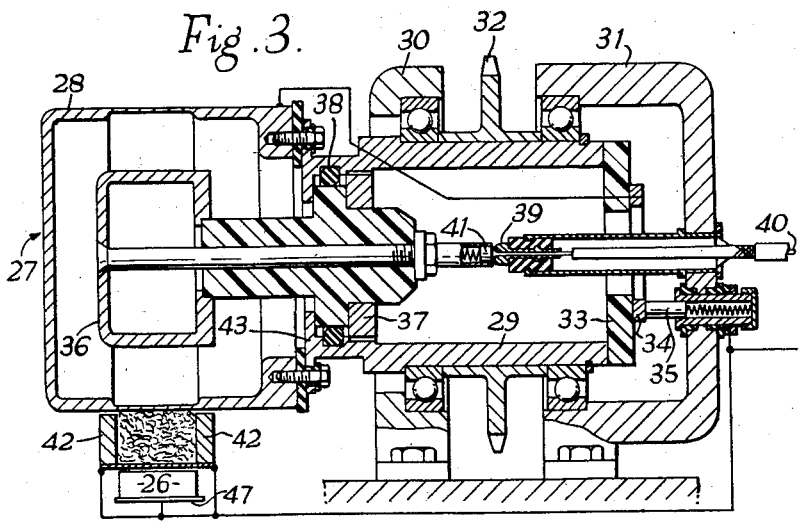
Figure 4:
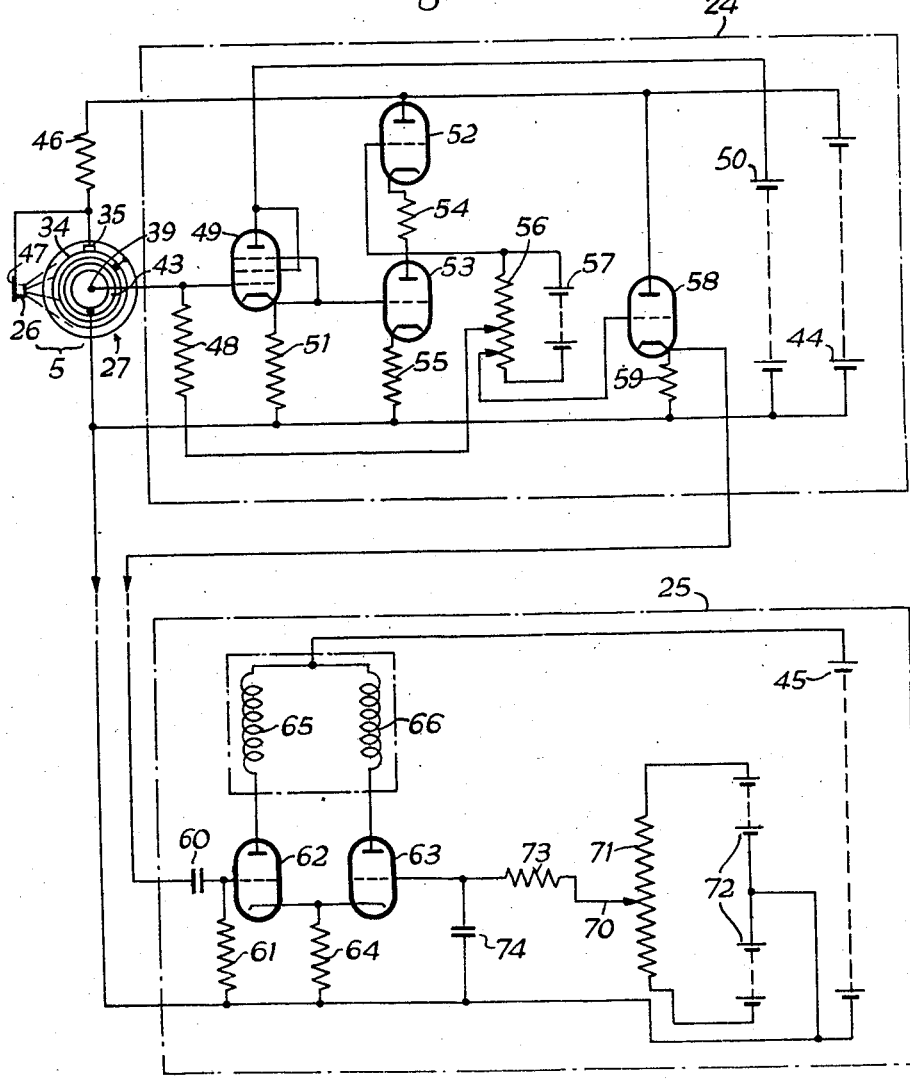
Figure 5:
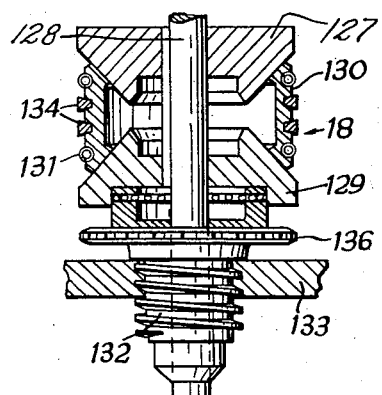
Figure 6:
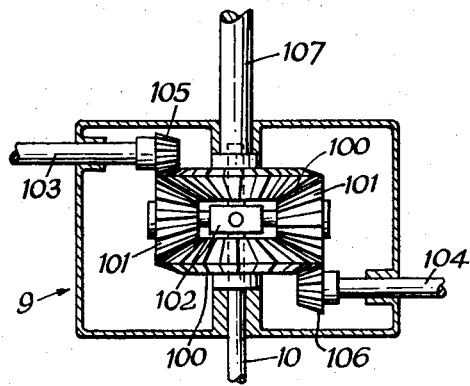
Figure 7:
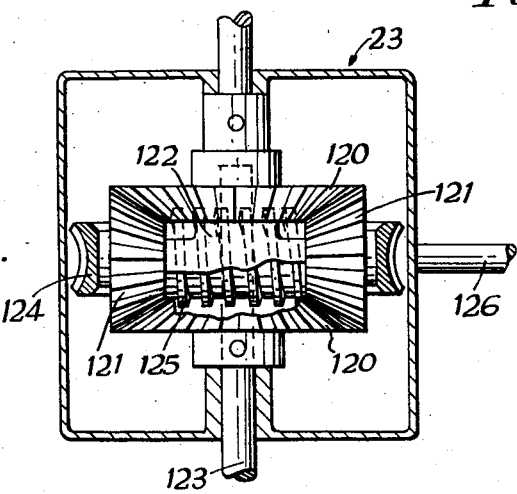
Figure 8:
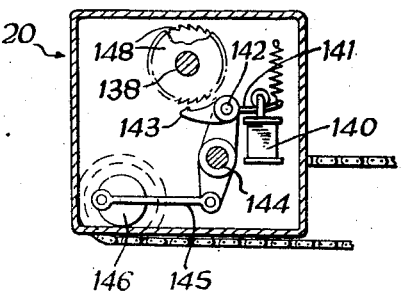
Figure 9:
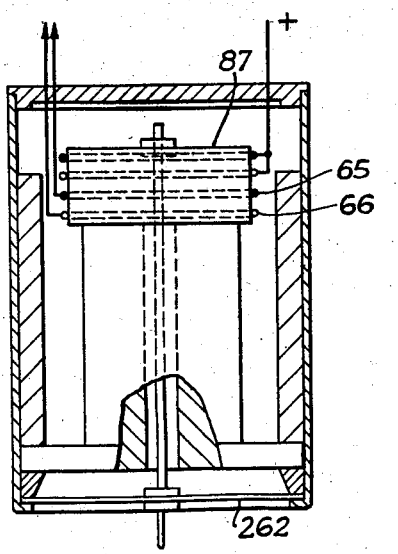
Figure 10:
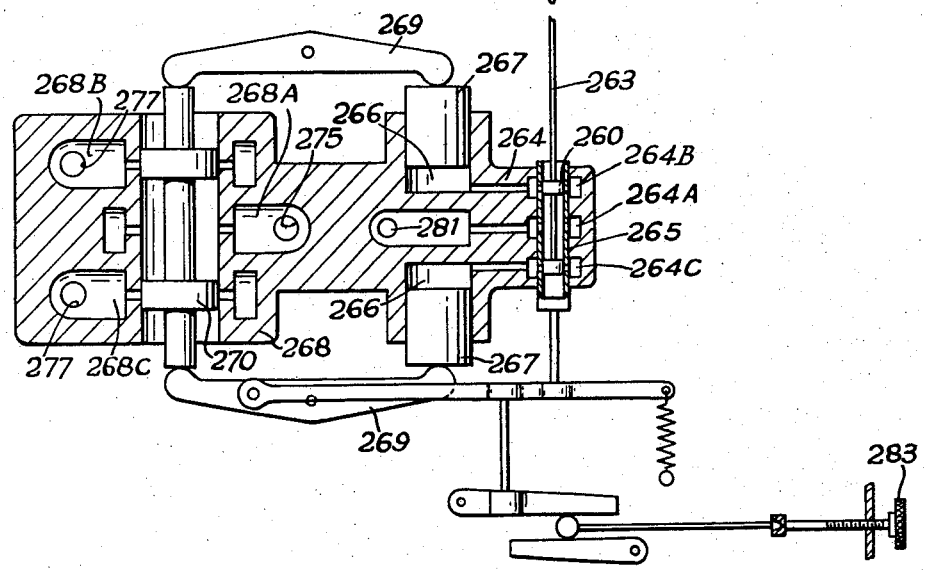
Figure 10:

The invention will be more fully described with reference to the accompanying drawings in which:

Figure 1 is a diagram of a continuous rod cigarette making machine, showing the application of the invention thereto, Figure 2 shows to a larger scale details of a pulley and conveyor shown in Figure 1, Figure 3 is a longitudinal section of a source-gap-chamber device shown in Figure 1, and drawn to a larger scale, Figure 4 is a circuit diagram of the connections between an ionization chamber and the coils of a magnetically operated valve positioning device, Figure 5 is a sectional plan of a variable speed pulley shown in Figure 1 and drawn to a larger scale, Figure 6 is a view, partly in section, of a differential gear shown in Figure 1 and drawn to a larger scale, Figure 7 is a view, partly in section and partly broken away, of another differential gear shown in Figure 1 and drawn to a larger scale, Figure 8 is a sectional elevation of a device shown in Figure 1 for adjusting the variable pulley of Figure 5, and drawn to a larger scale, Figure 9 is a sectional view of a control valve shown in Figure 11 drawn to a larger scale and also showing an operating magnet, Figure 10 is a plan of a spring shown in Figure 9, and Figure 11 is a perspective view, partly in section, of a device known as an oil unit and shown diagrammatically in Figure 1.

Referring to the drawings, 1, Figure 1, is the hopper of the machine from which tobacco is showered in the usual way on to a hopper tape 2 which is arranged to run in the opposite direction to that usually employed. The tape 2 passes round a pulley 3 and delivers the collected shower or loose filler to a belt conveyor 4, which conveys the tobacco downwards as shown and delivers it over a thin curved guide plate 4A to a conveyor belt 6.

At 15 there is a source-gap-chamber device which measures the mass of the tobacco collected on the tape 2, which mass is nominally that of the final cigarette rod. The output from the ionization chamber of the device 15 is fed to an amplifier and feed-back filter at 16, and is then taken to a long time constant circuit at 17 to control (through an actuator 20 which itself is controlled by a relay unit 21 explained more fully later), a variable speed pulley drive 18 to the hopper 1 in addition to going to a variable speed oil unit 19.

The whole machine is driven by a motor 22 which is connected, as shown, by a chain 22A to a differential gear 23, through which the pulley 3 is driven. The oil unit 19 controls the output from the differential gear 23, as will be described fully hereafter and, consequently, the speed of the hopper tape 2 is controlled from the output of the ionization chamber of the device 15.

With the arrangements thus briefly described the drive to the pulley 3 will take care of longer-term variations in the tobacco showered but in the event of abnormal deficiency or excess of tobacco in the shower the mechanism inside the hopper will have its speed increased or decreased by adjustment of the variable speed pulley 18. This arangement is necessary because the differential gear 23 and oil unit 19 employed are only capable of controlling the speed of the pulley 3 over a limited range ($\pm 10\%$) and if the mean hopper output changes beyond this range it is necessary to deal directly with the hopper itself. Abnormal changes in hopper output are not usually met with in general running but as the hopper is charged with tobacco manually at random intervals the operator may let the quantity of tobacco in the hopper run very low sometimes or dump an excessive amount into the hopper for recharging and the output is liable to be upset in such circumstances. If for any such reason the actuator 20 is brought into operation it will continue to regulate the hopper until the mean output is again within the control range of the differential gear 23 and oil unit 19. The time constant circuit 17 provides a time constant which is long compared with the time constant of the feed-back amplifier 16 and the rate of correction by the actuator 21 is small to ensure that the two controls do not conflict with one another.

The differential gear 23 is best seen in Figure 7 and comprises sunwheels 120 and planet wheels 121 mounted on a planet carrier 122 rotatable on a shaft 123 which drives the pulley 3 through bevel gear wheels. The planet carrier and planet wheel assembly are carried by a cage having a worm-wheel 124 formed on its exterior and this is driven from the oil unit 19, Figure 1, by a worm 125 fixed to a shaft 126.

The variable speed pulley 18, shown in detail in Figure 5, is of well-known construction comprising a cone 127 fixed to a shaft 128 which is illustrated in Figure 1 as an extension of the shaft of the motor 22. Another cone 129 is slidable on a spline on the shaft 128 and between the cones are a number of segments 130 which can slide in grooves (not shown) in the cones as the latter move towards and away from one another, and are held to the cones by spring rings 131. The movable cone is moved by a screw 132 working in a nut formed in a frame member 133. Belts 134 couple the variable speed pulley to a pulley 135, Figure 1, which drives the hopper through the bevel gear wheels shown. The screw 132 is rotated in either direction by a sprocket wheel 136 integral therewith. This sprocket wheel is connected by a chain to another sprocket wheel 137, Figure 1, fixed to a shaft 138 of an actuator 20 now to be described.

Referring mainly to Figure 8, the actuator, which is a well-known device, consists of a pair of solenoids 140 whose plungers are connected each to one arm 141 of two double-armed levers which are pivoted at 142. The other arm of each of said double-armed levers is formed as a pawl 143.

The two double-armed levers are pivoted at 142 on a further double-armed lever pivoted at 144 and whose lower end is coupled to a connecting rod 145 driven by a crank disc 146. As shown in Figure 1 the disc is on a crankshaft 147 driven by chain gearing from the shaft 128 of the motor 22 so that while the machine is working both pawls are in continuous oscillation. Above the pawls are two ratchet wheels 148 with oppositely directed teeth so that if one pawl is caused to engage its ratchet wheel the shaft 138 will be turned one way while if the other pawl is caused to engage its ratchet wheel the shaft 138 will be turned in the opposite direction. Pawl engagement is caused by energisation of a solenoid 140 which pulls down the lever arm 141 against a spring.

The oil unit 19 is identical with another shown at 69 in Figure 1 and as the latter is presently described in great detail the same description will apply to the unit 19.

In this way the loose filler on the conveyor 4 and passing over the curved guide 4A has a mass which is reasonably regular as considered over longer-term periods and the remaining apparatus shown in Figure 1 is devoted to the task of manipulating this filler to try and correct shorter-term irregularities therein.

At the lower end of the conveyor 4 is a source-gap-chamber device 5 which is of special construction and will be described in detail later, with reference to Figure 3. It will be noted that the tobacco is received on the conveyor belt 6 at a position where the belt is supported by a pulley 7.

The belt 6 is of elastic material and is driven at the left-hand end of the figure by a pulley 8 running at constant speed and at the right-hand end by the pulley 7. These two pulleys which are toothed in the manner shown in Figure 2 ensure that while the belt is in full engagement with the teeth, the linear speed of the belt is controlled, while the elastic belt itself allows of variation in the speed of the pulley 7 relatively to the pulley 8. The pulley 7 and belt 6 are shown in detail in Figure 2. The belt has teeth (e.g. metal teeth bonded to the belt) arranged on its inner side. The teeth are pointed and have involute flanks. The pulley is provided with correspondingly shaped grooves and it will be seen that the part of the belt which receives the filler is held on the pulley 7 and is therefore unstretched for the distance shown by the double-headed arrow. The upper and lower runs of the belt will frequently be stretched during operation, as explained more fully later, but as the stretch is not excessive, the points of the teeth will enter the grooves in the pulley, even when somewhat out of pitch, and so the belt readily mates with the pulley 7 although the lower run may be stretched. The spaces between the grooves on the pulley are, in effect, teeth and the pulleys have been referred to as toothed pulleys.

The term "unstretched" means that no change is made in the normal tension existing in the belt, for naturally the belt is stretched to some extent when it is mounted on the pulleys as is usual with belts.

The action is as follows:

The pulley 7 is coupled with the front pulley 8 through a small differential gear 9. This differential gear is shown to a larger scale in Figure 6 and comprises sunwheels 100 and planet wheels 101, the latter being mounted on a planet arm 102 fixed to a shaft 10. The sunwheels 100 drive the pulleys 8 and 7 through shafts 103 and 104 respectively, said shafts being coupled to the sunwheels by bevel gear wheels 105 and 106 engaging teeth formed on the back of the respective sunwheels. The upper sunwheel, Figure 1, of the gear is fixed to a shaft 107 driven by chain gearing from the driving motor shaft and thus the drive to the pulley 8 is at unvarying speed. If the planet carrier 102 is fixed in position the pulley 7 is also driven at unvarying speed but by varying the speed of the input shaft 10 (that is, the planet control shaft) of the gear from zero in a positive or negative direction, the speed of the pulley 7 relatively to the front pulley 8 can be varied. As will appear later the speed of the pulley 7, at any instant, is determined by reactions from the source-gap-chamber device 5.

The tobacco filler on the elastic belt 6 is passed down a sloping passage 11, constructed and operating as described in U.S. Patent No. 2,671,452, issued March 3, 1953, and delivered to the cigarette paper web 12 which is moved by a garniture tape 13 driven by a tape drum 14, in the usual manner of continuous rod cigarette machines. The tape drum is driven at constant speed by the chain and bevel wheel gearing shown in Figure 1.

The measurement in the source-gap-chamber 5 is effected on a very short length of filler and the measurement of ionization current is performed in a simple manner, as explained later. The measurement is used only to reduce the shorter-term irregularities in the already manipulated filler and the filter networks of the two stages are so chosen that at the frequencies where one measurement leaves off the second takes over, the actuator 20 controlling the hopper speed dealing only with persistent mean drifts. The actuator 20 is, as aforesaid, controlled from the relay unit 21 consisting of a limit relay switch with close limits, the unit itself being under control of the time constant device 17.

The remaining items in Figure 1 will be described together with Figures 3 and 4 because some items of the circuit are subject to mechanical control and are indicated both in Figures 1 and 3 and some electrical items operate on mechanical contrivances and are therefore shown in both figures. In Figure 1 the box marked 24 contains the circuit elements shown in the top part of Figure 4, where the box is shown in chain lines. The enclosed apparatus is termed the pre-amplifier. The lower box 25 in both figures contains the circuit elements for the speed control of the belt 6.

For the source-gap-chamber device 5 the source 26 is located as close as possible to the delivery point of the tobacco on to the belt 6 and is very short, and the ionization chamber of the combination, which chamber is generally represented by the reference 27 is constructed in pulley form with a rim of approximately 0.010" thickness for the width of the tobacco stream. The chamber section can be seen in Figure 3, where it will also be seen that the outer part 28 of the chamber is fixed to a long hollow hub 29 running in ball races in housings 30 and 31. A sprocket wheel 32 is fixed to the hub, whereby the chamber is rotated at the required speed. An insulating ring 33, fixed at one end of the hub carries a slip ring 34 contacted by a brush 35 to apply the polarizing voltage to the outer part 28 of the chamber. The inner part 36 of the chamber is clamped to the part 28 by a nut 37 with a sealing ring 38 between the parts. Contact is made to the rotating part 36 by a contact 39 at the end of the signal cable 40, the contact engaging a spring-pressed stud 41. The end of the hub is shaped to form the guard ring 43 of the chamber and is thus grounded through the hub, bearings and housings. Side guides 42 for the tobacco filler are also shown.

Referring now to the upper part of Figure 4 the polarizing voltage for the rotary chamber is fed from a battery 44 through a current limiting resistor 46 and this same potential is applied to the source mounting plate 47 and the adjacent guides 42, Figure 3, to prevent a potential difference across the tobacco stream.

The ionization chamber collector electrode 36 is connected through the contact 39 to the upper end of an input resistor 48, and to the grid of the electrometer tube 49 shown operating as a triode-connected cathode follower and with its anode voltage supplied from a battery 50, the tube circuit being completed by a cathode resistor 51.

The output from the tube 49 is applied to the series-connected triodes 52 and 53 provided with cathode resistors 54 and 55 and forming a stable and linear amplification stage with a gain of approximately half the amplification factor of the individual tubes. The output of this stage is taken from the anode of the tube 53 and applied to the upper end of a resistor 56 and the positive terminal of a battery 57. The upper slider of the resistor 56 provides a voltage which is negative relative to the anode of the tube 53 and which is applied to the lower end of the input resistor 48, the whole circuit from the upper end of resistor 48, through 49, the series amplifier formed by tubes 52 and 53 and through resistor 56 forming a loop with considerable gain, connected so as to degenerate the capacitance across the input signal cable and to provide the shortest possible measuring time-constant compatible with the random source emission and the arrangement of the loose tobacco in the tobacco stream. The upper sliding contact on resistor 56 is so adjusted that with an ionization current resulting from the desired mean weight of tobacco stream, flowing in the high value resistor 48, the resultant potential applied to the grid of the electrometer tube 49 is sufficiently negative for optimum conditions. The lower slider of the resistor 56 is connected to the grid of a tube 58 which, with a resistor 59, forms a cathode-follower stage to give an output which is a faithful copy of the input, but with a low impedance, for connection to the circuit elements in the speed control stage box 25, which may be located some distance away.

The output signal from the tube 58 is connected through a resistance-capacity coupling of long-time constant provided by a capacitor 60 and a resistor 61 to the grid of a tube 62 which, with a tube 63, forms a common cathode amplifier with a cathode resistor 64.

In the anode circuit of the tubes 62 and 63, which are supplied with anode voltage from a battery 45, are coils 65, 66 which are wound on a moving coil element 87 which operates as a valve positioning device, see Figures 1 and 9. These coils are connected to form a differential linear-movement solenoid device of known kind, which is illustrated in Figure 9 and described below, and provided with a permanent magnet field and arranged so that with equal current in both coils there is no resultant force on the coil assembly. The coil assembly itself is provided with a positioning spring spider 262, Figure 10, described below, with linear deflection/force characteristics, which accurately positions the moving coil element at all times.

When the current through the tube 62 increases, the current through the tube 63 decreases, and the resultant out-of-balance force between the two coils 65, 66 causes an axial movement of the assembly which continues until the spring spider exerts an equal and opposite force.

When the current through the tube 62 decreases, the current through the tube 63 increases, and an axial movement is obtained in the opposite direction.

The differential solenoid device has its moving coil element 87 coupled to a valve, which valve constitutes the sensitive valve of the oil unit 69. This unit is the same as the oil unit 19, previously referred to, and the construction of the oil unit 69 will now be described with reference to Figures 9 and 11, this description also serving for the oil unit 19. The unit consists of a high-pressure oil pump 273 and a sensitive valve 260 which controls the feed of oil to an oil motor 276 and determines its direction and speed of rotation, the speed being approximately proportional to the displacement of the sensitive valve 260. This valve is diagrammatically indicated in Figure 1 by a rectangle marked 260. The valve is coupled by a rod 263 to the moving coil element 87, on which is wound the differential coil winding 65, 66, and which is movable in a magnetic field provided by a permanent magnet 261. The centre-stable spring spider 262, referred to previously, is thus subjected to a force proportional to, and in a direction depending on the relative currents in the coils 65 and 66. The valve 260 is formed as a piston valve working in a sleeve 265 having three ports. This sleeve vibrates in a valve body 264 also having three ports 264A, 264B and 264C, the outer ones 264B and 264C leading to cylinders 266 with pistons 267. Oil supplied through a pipe 281 to the middle port 264A can go into either of the outer ports depending on the position of the sensitive valve, and the corresponding piston 267 is moved outward. The sleeve 265 is called a "ditherer" and it is oscillated or vibrated by an eccentric rod 282, Figure 11, so as to ensure that at all times the ports are freely lubricated, for if the sensitive valve remained in one position for a long time, it might not move quite freely under the impulse of the magnet and it is important that this valve should follow magnetic movements without hesitation. Adjustment of the dithering movement from rod 282 is by a screw 283. The pistons 267 operate pivoted levers 269 which press on the main valve 270 and determine its position in the main valve body 268. The main valve body 268 has three outlets 268A, 268B and 268C, the outer ones 268B and 268C leading to the oil motor 276, Figure 11, and the middle one 268A receiving oil from the oil pump 273, as will be explained with reference to Figure 11. The oil unit is driven, as shown in Figure 1, by an electric motor 80 and this runs all the time the machine is working. Thus the oil unit pump continuously pumps oil through a pipe 275 to the main valve body 268 previously described with reference to Figure 9, from which oil to the oil motor 276 is fed through pipes 277. One pipe is the feed and one the exhaust, according to the position of the main valve 270. Oil coming back through the exhaust pipe drops out of the valve body 268 into a sump (not shown) formed in the casing of the unit and oil from the sump is sucked up by the oil pump 273 through a pipe 284. The main valve has its position controlled by the moving coil element 87, as previously described with reference to Figure 9, and consequently the movements of the oil motor 276 depend entirely on the position of the sensitive valve 260 which position is controlled by the element 87. The shaft of the oil motor is integral with or directly coupled to the planet control shaft 10 of the differential gear 9. An adjustment is provided at 278 for the pressure of the oil in the system by regulation of a pressure controller 279 which receives oil from a by-pass 280 from the main oil supply pipe 275.

This oil unit is a known contrivance and has been largely used for the control of gunnery, particularly for anti-aircraft guns, and it has the virtue that the oil motor movements correspond very accurately indeed with the position of the sensitive valve 260, and that there is no appreciable lag in the whole system.

Thus it will be apparent that the speed of the pulley 7 depends on the output from the ionization chamber 27 and changes with alterations in said output.

If the balance of the currents in the coils 65, 66, is upset by an input signal, the output shaft 10 rotates at a speed proportional to the input signal and in a direction depending on the polarity of the signal.

The conveyor belt 6 is, as previously mentioned, of an elastic nature, thus permitting relative peripheral speed changes of the pulleys 7 and 8. The permissible total of relative movement, while ample for the purpose is, however, limited and it is essential that the output shaft 10 of the oil motor, irrespective of its instantaneous velocity does not make more than a limited number of revolutions from a mean datum. Such an event might occur if there were a small change in the output sensitive valve position-characteristic, or a change in the characteristics of tubes 62 and 63.

To ensure that this excessive movement cannot happen, the output shaft of the oil motor of the oil unit 69 is coupled, as shown in Figure 1, to the arm 70 of a rotary potentiometer 71, the ends of which are connected to a source 72 of medium voltage. In the circuit diagram, Figure 4, the potentiometer and its arm are shown only diagrammatically, that is, not as a rotary device. Connections are taken from the centre tap of the source 72 of E.M.F. and from the arm 70 of the potentiometer 71. The voltage appearing across these leads will be dependent for magnitude and polarity on the amount of rotation of the output shaft 10 from its desired mean position. These leads are taken to an integrating circuit formed by a resistor 73 and a capacitor 74 and from the output of this circuit to the control grid of the tube 63.

In operation, shorter-term variations in the already manipulated filler cause variations in the ionization current in resistor 48 and variations in the grid potential of the tube 49. The presence of the amplifier loop formed by the connection from the slider of the resistor 56 to the lower end of resistor 48 causes less variation in the grid potential of 49 for a given ionization current than would otherwise be the case, and as previously stated, effectively reduces the time-constant of the measuring circuit. The resulting output signal is fed through the tube 58 to the resistance-capacity coupling 60, 61, which due to its long time-constant passes to the control grid of the tube 62 all the oscillating components of the signal but would attenuate and modify any lower frequencies due to any changes in the mean mass of the tobacco stream, though, as explained earlier, changes in the mean mass have been substantially corrected earlier. In other words the devices just described do not respond effectively to any change in the mean.

If the grid of the tube 63 is at earth potential, then the variation signals arriving at the grid of the tube 62 cause variations in the anode current and approximately equal but opposite variations in the anode current of tube 63. These out-of-balance currents flowing through the coils 65, 66 of the solenoid positioning device 67 cause a change in the position of the sensitive valve with a resulting rotation of the oil motor with a velocity proportional to amplitude of the deviation signal. The output shaft 10 of the oil motor is as aforesaid coupled to the differential gear 9 and increases or decreases the peripheral velocity of the belt pulley 7, on to which the tobacco stream is fed. The connections and proportions are made so that should the tobacco stream for a shorter-term period become, say, 10% heavy then the peripheral speed of the pulley 7 is increased by 10% so that the spreading of the tobacco on the unstretched piece of belt on top of the pulley remains as near as practicable to the desired uniformity, and vice versa.

Returning now to the grid circuit of tube 63, any movement of the oil motor shaft from its desired neutral position causes a voltage to be applied to the integrator circuit 73, 74, but this is arranged with a long time-constant so that the voltage applied to the grid of the tube 63 from the upper end of capacitor 74, and which is arranged to return the output shaft of the oil motor towards its neutral position, rises so slowly that it does not interfere with the excursions of the oil motor output shaft but ensures that should the output shaft tend to remain away from its neutral position for longer periods than are desirable then it is urged to return towards its neutral position.

What we claim as our invention and desire to secure by Letters Patent is:

1. A machine of the kind referred to comprising means for detecting mean irregularities occurring in a moving filler over time periods of at least three seconds, devices responsive to said means for manipulating the filler to, at least partly, correct them, means for detecting further irregularities in the manipulated filler occurring during shorter time periods not exceeding one second, and devices responsive to said last named means for further manipulating the filler to, at least partly, correct said further irregularities.

2. A machine of the kind referred to comprising a conveyor for a moving filler and means for feeding tobacco on to said conveyor to form the filler, a detector associated with said conveyor for detecting mean irregularities occurring in the filler over time periods of at least three seconds and means controlled by said detector to vary the speed of said conveyor substantially in accordance with the responses of the detector associated therewith whereby the quantity of tobacco collected per inch of conveyor is altered and the mean irregularities in the said filler are, at least partly, corrected, a second conveyor arranged to receive the filler from the first conveyor and having a detector associated therewith for detecting irregularities in the received filler occurring during time periods not exceeding one second and means controlled by the second said detector to vary the speed of the second conveyor at the receiving position to spread the received tobacco on the said second conveyor substantially in accordance with the responses of the second said detector, whereby the second said irregularities are, at least partly, corrected.

3. A machine as claimed in claim 2, comprising a tobacco hopper and means for feeding and showering tobacco therefrom upon said first conveyor to form the filler on the first said conveyor.

4. A machine as claimed in claim 3 comprising means for regulating the speed of the tobacco feeding means when the output thereof varies above or below a given tolerance.

References Cited in the file of this patent

UNITED STATES PATENTS 2,800,131     Molins et al.             July 23, 1957